No. 767,893. PATENTED AUG. 16, 1904.
W. S. JEWELL.
HOSE COUPLING.
APPLICATION FILED NOV. 11, 1903.
NO MODEL.
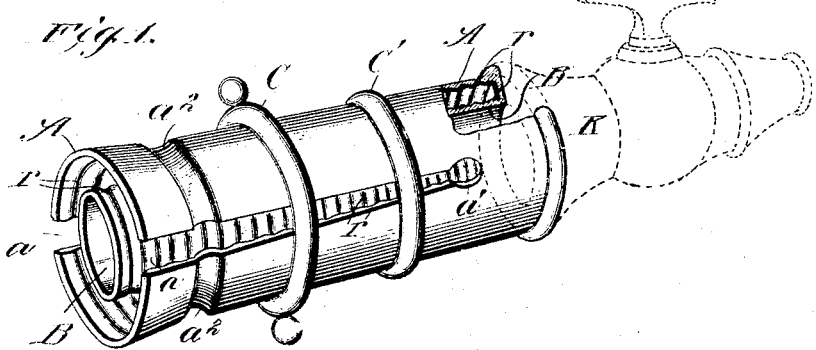
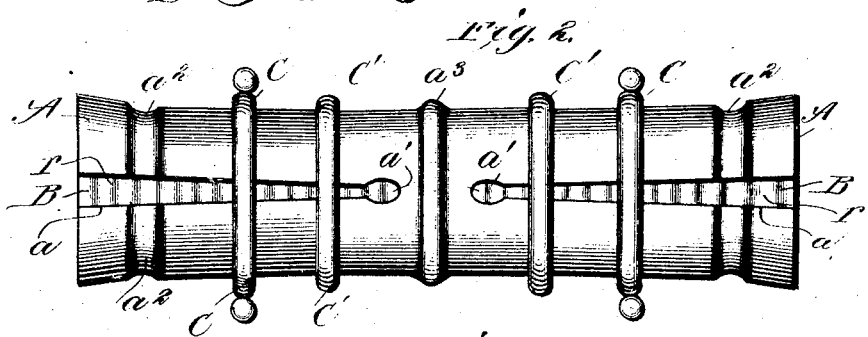
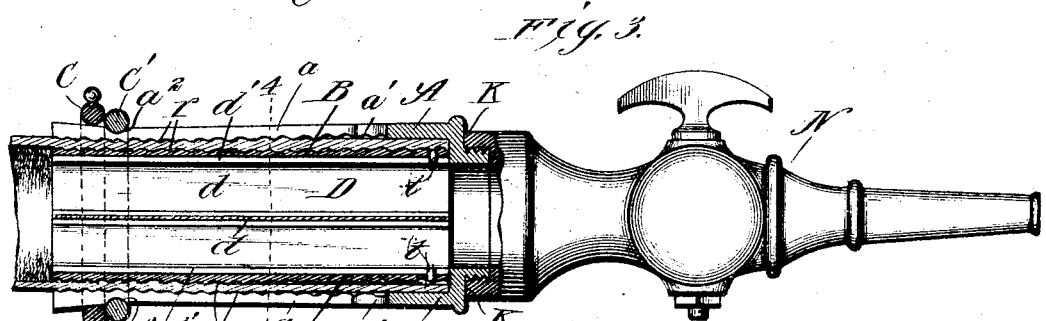
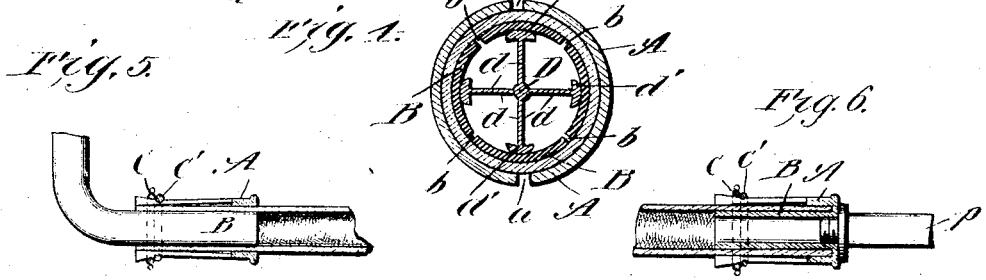
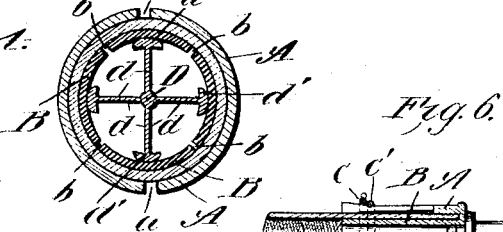
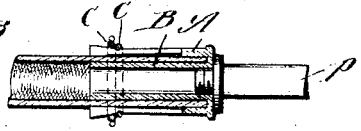
WITNESSES:
Fred F. Bradford
Edw. W. Byrn
INVENTOR
Walter S. Jewell
BY Munn & Co.
ATTORNEYS No. 767,893. Patented August 16, 1904.

UNITED STATES PATENT OFFICE.

WALTER SIMPSON JEWELL, OF OAKLAND, CALIFORNIA.

HOSE-COUPLING.

SPECIFICATION forming part of Letters Patent No. 767,893, dated August 16, 1904.

Application filed November 11, 1903. Serial No. 180,705. (No model.)

*To all whom it may concern:*

Be it known that I, WALTER SIMPSON JEWELL, a citizen of the United States, and a resident of Oakland, in the county of Alameda and State of California, have made certain new and useful Improvements in Hose-Couplings, of which the following is a specification.

My invention is in the nature of a hose-coupling designed to be applied to all kinds of hose, tubes, or pipes, to which it can be applied for the purpose of coupling the same either to a nozzle or for coupling two sections of hose or for connecting the hose to a stationary inlet or outlet pipe or for mending a broken or ruptured section of hose or tubing, the object being to provide a simple, cheap, and practical device which shall do away with all wiring, washers, screw-threaded and expensive and complicated parts, as well as special tools ordinarily used for such purposes, and which shall also secure a great saving of time, especially in mending or coupling in case of a fire.

My invention consists in the novel construction and arrangement of the parts of the coupling, which I will now proceed to describe with reference to the drawings, in which—

Figure 1 is a perspective view of my coupling as adapted to form a terminal nozzle. Fig. 2 is a side view of a double-ended construction as employed for connecting two sections of hose or mending a break in a hose. Fig. 3 is a longitudinal section of the device shown in Fig. 1, showing the same clamped upon the hose and provided with a separate nozzle. Fig. 4 is a cross-section on line 4 4 of Fig. 3. Fig. 5 shows the coupling applied to a stationary discharge-pipe or inlet-pipe. Fig. 6 shows another application.

In the drawings, A represents the outer shell, and B the inner shell of the coupling, which parts may be made of any size and of any material or combination of materials, but preferably of brass. The part A is provided with one, two, or more longitudinal slots $a$ extending from one end to nearly the other end, more or less, and terminating at the inner end in a rounded opening $a'$ to prevent splitting, and preferably having beyond this rounded opening somewhat thicker walls to further reinforce it against splitting strains. The shell as thus constructed has near its divided end a transverse concave groove $a^2$ extending around the same, and the two branches of this shell have some degree of elasticity, so that they may be spread apart or spring together.

B is the inner shell, which, as shown, is made in one piece, with the outer shell at the end K, but which may be separate, if desired.

On the outer shell are loosely retained two sliding rings C and C', which approximately fit the shell and are capable of being slid longitudinally thereon.

The end of the hose is to be inserted in the annular space between the outer shell A and the inner shell B and is there tightly clamped and retained between the two by sliding the two rings C and C' down toward the hose. The object in using the two rings is as follows: The ring C is made somewhat larger than C' in its inner circumference and is nearest the divided end. It is first slid down over the branches of the shell and up on the shoulder of the same beyond the groove $a^2$. The ring C' is then slipped down to and against the ring C and seats itself in the groove $a^2$, as seen in Fig. 3, thus acting as a check-ring to hold the ring C in place against accidental displacement and the consequent loosening of the coupling. When the coupling is to be released, the ring C is forced slightly farther up on the shoulder at the end of the shell A, so as to compress it sufficiently to allow ring C' to be dislodged from its seat in the groove $a^2$. The outer circumference of the extreme end of split portion of the outer shell is designed to be somewhat larger than the inner diameter of the ring C when the latter is forced down to its clamped position, so that it cannot slip off the metal coupling and onto the hose. To make a tightly-gripping joint between the two shells A and B and the hose between them, the adjacent surfaces of the shells A and B may be corrugated or roughened in transverse ridges $r$, which ridges may be arranged parallel to each other or spirally to form a coarse screw-surface. The outer curve of the shell B and inner surface of A are also made of a slightly-less circumference than the hose that they clamp, so that they will when forced together tightly pinch and clamp the hose.

The outer end of the shell B is also in some cases divided longitudinally for about one-third, more or less, of its length, as at b, Fig. 4, into two or more longitudinal branches, and within this divided end of shell B is arranged a reinforcing-core D, having radial flanges d, terminating at their outer edges in curved bearing-surfaces d' where they come in contact with the inner walls of the shell B. This core is made of the knife-like edges in cross-section, so that it does not seriously impede the flow of water through, and yet its curved bearing-surfaces d' hold the shell B from being collapsed by the compressive strain of the shell A and rings C and C'. The object in making the end of the shell B split or divided is as follows: When the hydraulic pressure of the water within comes upon the shell B, this pressure serves to slightly expand the shell B and is thus made to pinch the hose with a power commensurate with the pressure. The hydraulic pressure is thus made to greatly aid in tightly pinching the hose, and instead of forcing the nozzle off the hose holds it on more tightly in proportion to the pressure. As shown, the reinforcing-core D is attached to shell B at t and made with four wings or flanges; but I would have it understood that the wings may be greater or less in number, according to the number of split sections of the shell B.

When the shells A and B are united at the end K, Fig. 1, they may form the nozzle itself with or without any other attachment, the end K being extended and made smaller at the exit, or a separate nozzle or part of a nozzle may be soldered onto the exit end with cock for changing the character of the stream, as shown in dotted lines in Fig. 1. This may also be made in one piece with my device; but the end K may be screw-threaded exteriorly or interiorly to receive a separate nozzle N, as shown in Fig. 3.

When the coupling is employed for connecting two sections of hose or for mending a rupture in a line of hose, said coupling is made with two similar ends, as shown in Fig. 2, each end of which receives a section of the hose. A middle ridge $a^3$ is formed on the outer shell to keep the two pairs of rings separate.

When the coupling is to connect a hose to a hydrant or other stationary inlet or outlet, the spout or discharge-pipe of the hydrant may be made to take the place of the inner shell B, as seen in Fig. 5, and for this purpose either the form shown in Fig. 1 or that shown in Fig. 2 may be used, or the inner shell may be made with a screw-thread adapted to couple with the hydrant-pipe p or plug, as in Fig. 6, and there permanently remaining, if desired.

In some applications of my invention the inner shell B need not be split and the inner reinforcing-core may be dispensed with, as seen in Fig. 1.

I do not confine myself to the specific device shown in my drawings, as these may be varied in many respects without departing from my invention as hereinafter set forth in the claims.

Having thus described my invention, what I claim as new, and desire to secure by Letters Patent, is—

1. A pipe-coupling consisting of an inner shell, an outer shell divided at one end into longitudinal branches and having an external transverse ring-seat, and two rings sliding on the outer shell, one being made slightly larger than the other, to slide past the ring-seat and the other being adapted to lock the former, by falling into the ring-seat, substantially as shown and described.

2. A pipe-coupling consisting of an inner shell, an outer shell having each of its ends divided longitudinally, and formed with external transverse ring-seats, and two sliding rings at each end, the outer rings being made larger than the inner rings of each pair, and arranged to compress the outer shell, and be locked by the inner rings, substantially as shown and described.

3. A pipe-coupling consisting of an inner shell and an outer shell connected together, the outer shell being at its free end divided longitudinally, and provided with an external transverse ring-seat, and two coacting locking-rings sliding on the outer shell, substantially as shown and described.

4. A hose-coupling consisting of two shells between which the end of a flexible hose may be clamped, the inner shell being divided longitudinally to permit of its expansion from hydraulic pressure within, whereby the hose end is pinched and clamped between the two shells with a grip increasing with the hydraulic pressure within, substantially as described.

5. A hose-coupling consisting of an outer shell, a partly-divided inner shell adapted to be expanded by the hydraulic pressure within, a reinforcing-core arranged within the inner shell to prevent collapsing, and clamping devices for securing the hose end between the two shells, substantially as described.

6. A hose-coupling consisting of an outer shell, a partly-divided inner shell adapted to be expanded by the hydraulic pressure within, a reinforcing-core arranged within the inner shell and made with radial flanges having curved bearings along their edges, and clamping devices for securing the hose end between the two shells, substantially as described.

WALTER SIMPSON JEWELL.

Witnesses:
JOHN J. BURKE,
CHAS. E. SNOOK.